(12) United States Patent
Demick et al.

(10) Patent No.: US 8,833,069 B2
(45) Date of Patent: Sep. 16, 2014

(54) HYDROSTATIC CIRCUITS WITH VARIABLE CHARGE AND VARIABLE FLUSHING SYSTEMS

(75) Inventors: Christopher J. Demick, Fuquay-Varina, NC (US); Paul A. Dvorak, Sanford, NC (US); William Christopher Swick, Apex, NC (US); Vincent Guyard, Meyzieu (FR); Christopher Mark Elliott, Apex, NC (US); Christopher Pruess, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 728 days.

(21) Appl. No.: 13/162,172

(22) Filed: Jun. 16, 2011

(65) Prior Publication Data

US 2012/0317964 A1    Dec. 20, 2012

(51) Int. Cl.
| | |
|---|---|
| *F15B 21/08* | (2006.01) |
| *F16D 31/00* | (2006.01) |
| *F16H 61/4104* | (2010.01) |
| *F15B 21/04* | (2006.01) |

(52) U.S. Cl.
CPC ....... *F16D 31/00* (2013.01); *F15B 2211/20553* (2013.01); *F15B 2211/611* (2013.01); *F16H 61/4104* (2013.01); *F15B 21/042* (2013.01); *F15B 2211/7058* (2013.01)
USPC .............................................. 60/464; 60/453

(58) Field of Classification Search
USPC ............................ 60/422, 431, 464, 494, 453
See application file for complete search history.

(56) References Cited

U.S. PATENT DOCUMENTS

| | | | |
|---|---|---|---|
| 3,866,422 A * | 2/1975 | Kersten ............................ | 60/456 |
| 4,376,371 A * | 3/1983 | Kojima et al. .................. | 60/420 |
| 5,000,001 A * | 3/1991 | Christensen et al. ........... | 60/450 |
| 5,207,059 A * | 5/1993 | Schexnayder ................... | 60/465 |
| 5,941,689 A | 8/1999 | Skirde | |
| 6,263,670 B1 * | 7/2001 | Gluck et al. ..................... | 60/464 |
| 6,339,928 B1 * | 1/2002 | Gollner .......................... | 60/464 |
| 6,430,923 B1 * | 8/2002 | Meier ............................. | 60/464 |
| 6,457,487 B1 * | 10/2002 | Stephenson et al. ........... | 91/459 |
| 7,111,458 B2 | 9/2006 | Gandrud | |
| 2008/0238187 A1 | 10/2008 | Garnett et al. | |
| 2009/0133396 A1 | 5/2009 | Wustefeld | |
| 2010/0132352 A1 | 6/2010 | Throckmorton | |
| 2010/0293937 A1 | 11/2010 | Ramm | |

\* cited by examiner

*Primary Examiner* — Thomas E Lazo
(74) *Attorney, Agent, or Firm* — Miller, Matthias & Hull

(57) ABSTRACT

A closed hydrostatic circuit with variable charge and variable flushing systems is disclosed. A variable displacement charge pump is configured to supply charge fluid and pilot control fluid to the hydrostatic circuit. An electronically controlled pressure regulating valve is in communication with an output of the charge pump and is linked to a controller. When the hydrostatic control system detects a high hydraulic temperature condition, the electronically controlled pressure regulating valve, that is in communication with an output of the charge pump and that is linked to a controller, increases the charge pump flow. A bidirectional variable displacement hydrostatic motor is connected in parallel to two input/output lines. A flush valve is in communication with the hydrostatic motor and both input/output lines. The flush valve and hydrostatic motor are both in communication with the flush orifice and a flush relief valve. When the pressure regulating valve causes the charge pump to operate at or near a full capacity, fluid exits the flush valve and passes through both the flush orifice and the flush relief valve. In contrast, when the pressure regulating valve causes the charge pump to operate at a lower or near minimum capacity, fluid exits the flush valve and passes through the flush orifice only without passing through the flush relief valve.

20 Claims, 1 Drawing Sheet

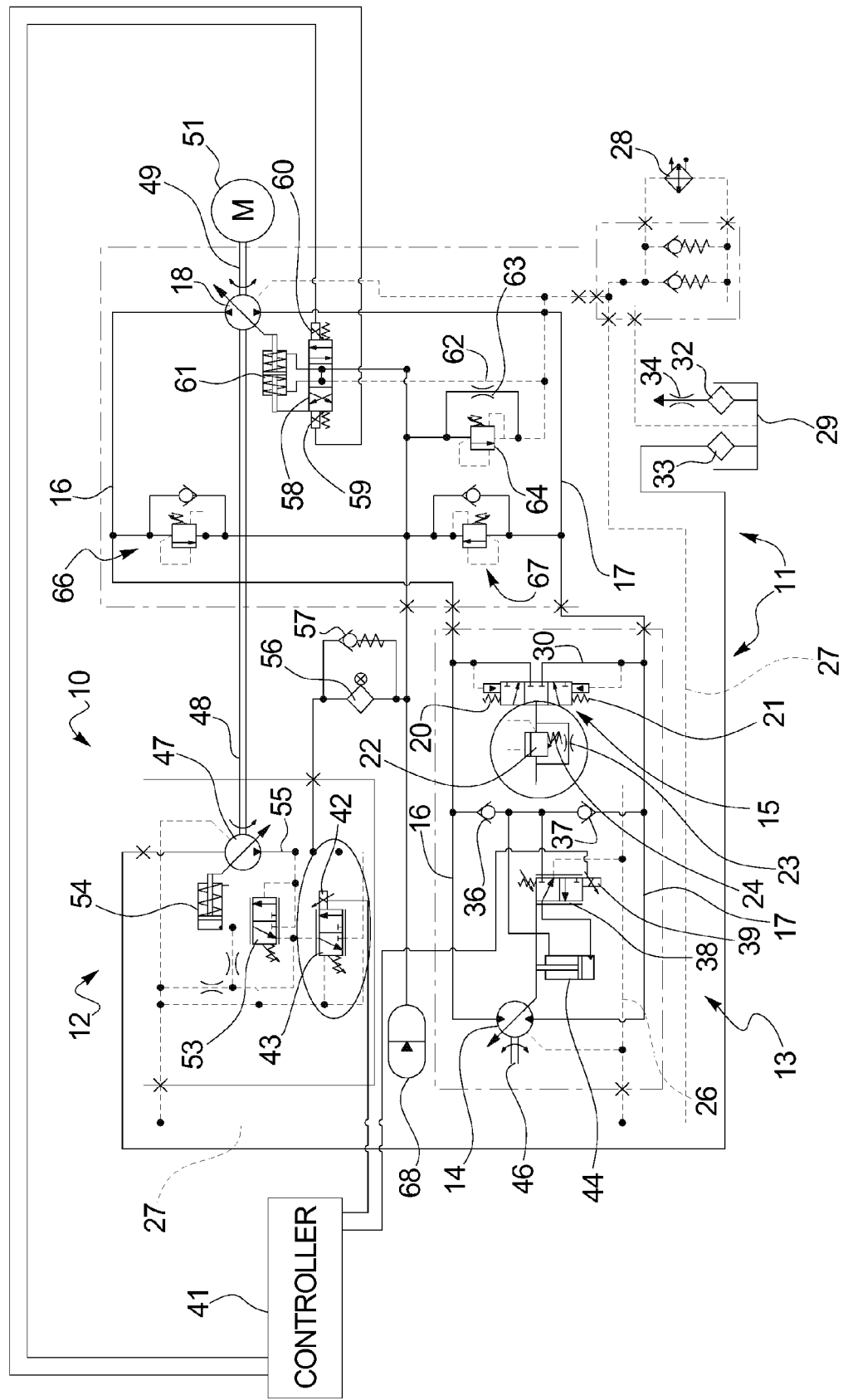

HYDROSTATIC CIRCUITS WITH VARIABLE CHARGE AND VARIABLE FLUSHING SYSTEMS

TECHNICAL FIELD

This disclosure relates generally to variable charge and flushing systems for hydrostatic circuits and methods for charging and flushing hydrostatic circuits.

BACKGROUND

In the art of hydrostatics, oil or fluid is pumped by mechanical hydrostatic pumps for the purpose of causing a hydrostatic motor to revolve, a hydrostatic cylinder to extend, or for other useful purposes. A common aspect of many tractors, earth-moving machines and the like is a hydrostatic transmission. In its most basic form, a hydrostatic transmission consists of a hydrostatic pump which is normally driven by an internal combustion engine, and provides a source of pressurized oil flow which causes one or more hydrostatic motors to rotate. The rotation of these one or more hydrostatic motors will cause the machine to travel forward or reverse as commanded by the operator of the machine.

In contrast, to hydraulic transmissions, hydrostatic transmissions operate in what is known as a closed circuit. In a closed circuit, pressurized oil from a pump is piped directly (or through valving) into a motor. Oil is returned from the motor to the pump. This system is known as closed circuit because hydrostatic fluid (i.e. hydrostatic oil) normally circulates in a closed path between the pump and the motor without passing into an oil reservoir on each pass. This closed circuit differs from an open circuit where a pump draws hydraulic fluid from a fluid reservoir, the fluid is piped to the motor, and then the return fluid from the motor is piped back into the fluid reservoir. Even in a closed circuit, a small reservoir and a charge pump will be used to collect the small amount of fluid which leaks out of the circuit and to replace that flow so that the closed circuit remains full of fluid at all times.

When a hydrostatic transmission is operated under heavy loads for an extended period of time, it is possible for the oil, which is pumped in the closed circuit, to become heated to an extent which may not be desirable. This heating occurs due to friction and other processes. Hydrostatic fluid may degrade more quickly when maintained at excessive temperatures, thus requiring premature replacement of the hydrostatic fluid. Further, elevated temperatures, hydrostatic fluid may lose certain lubricating properties including, but not limited to, viscosity. When a hydrostatic fluid loses viscosity, it compromises the fluid's ability to prevent damaging wear to the hydrostatic machinery. In order to remove heated oil from the closed circuit, a "controlled leak" or flushing system is employed to remove fluid from the circuit. This oil is then cooled and replaced back through a charge pump.

Usually the flushing system uses a flush valve that is connected to both the high pressure and low pressure fluid paths on a closed hydrostatic circuit. The flush valve is configured to select the lower pressure line of the two hydrostatic circuit pressure lines in the closed circuit. The flush valve is further connected to an orifice, or to a pressure relief valve, or to some combination of both. This relief valve serves to relieve circuit charge pressure and to control the release of hydrostatic fluid from the circuit. The orifice serves to provide a minimal flushing flow of hydrostatic fluid through the circuit to maintain the fluid at an appropriate temperature.

Hydrostatic systems include several deficiencies. For example, current circuit flushing systems that incorporate a flush valve and a relief valve cannot be intelligently controlled. Because the system is not intelligently controlled, the circuit flushing action occurs whenever the transmission is operational. Therefore, a circuit flushing system must be sized to flush an adequate flow of hydrostatic fluid under worst case operating conditions. Consequently, the volume of circuit flushing flow will therefore always be as high as the flow required under the most severe operating conditions. Because the circuit flushing flow is typically higher than desired, a larger charge pump is required which will consume more energy and result in increased system energy losses.

Circuit flushing flow also causes energy and system efficiency losses known as parasitic losses at low speeds and/or low temperature conditions. Because the fluid in the circuit is pressurized, circuit flushing flow causes a frictional loss or waste of hydrostatic energy. This loss ultimately requires more power from the internal combustion engine and higher fuel consumption than would be otherwise required. Conversely, the circuit flushing flow must be maximized as the engine speed is increased or the hydrostatic fluid will become too hot and in danger of dropping below a minimum desired viscosity, e.g., 10 sCt.

SUMMARY OF THE DISCLOSURE

A closed hydrostatic circuit with a variable charge system and a variable flushing system in disclosed. The hydrostatic circuit includes a reservoir configured to hold the supply of fluid. The circuit also includes a variable displacement charge pump configured to supply charge fluid and pilot control fluid to the hydrostatic circuit. The circuit also includes an electronically controlled pressure regulating valve in communication with an output of the charge pump and linked to a controller. The circuit further includes a bidirectional variable displacement hydrostatic motor. The hydrostatic motor is connected to two input/output lines. The input/output line that has a higher pressure than the other input/output line serves as an input line while the input/output line having a lower pressure serves as an output line. The circuit also includes a flush valve in communication with the hydrostatic motor and both input/output lines. The flush valve and hydrostatic motor both are in communication with a flush orifice and a flush relief valve. When the pressure regulating valve causes the charge pump to operate at or near full capacity, fluid exits the flush valve and passes through both the flush orifice and the flush relief valve. Further, when the pressure regulating valve causes the charge pump to operate at or near a minimum capacity, fluid exits the flush valve and passes through the flush orifice without passing through the flush relief valve.

A refinement, a method of charging and flushing a closed hydrostatic circuit is disclosed. The method includes electronically controlling a variable displacement charge pump configured to supply charge fluid and pilot control fluid to a hydrostatic circuit. The method also includes electronically controlling a bidirectional variable displacement hydrostatic motor. Further, the method includes operating a motor at or near a maximum capacity and flushing fluid through a flush valve, a control orifice and a relief valve when the charge pump is operating at or near maximum capacity. The method further includes operating the motor at less than the maximum capacity and flushing fluid through the flush valve and control orifice only when the motor is operating at less than the maximum capacity.

In another refinement, a hydrostatic transmission is disclosed. The hydrostatic transmission includes a reservoir configured to hold the hydrostatic fluid. The hydrostatic transmission also includes a variable displacement charge pump configured to supply charge fluid and pilot control fluid to the hydrostatic circuit. The charge pump is coupled to a drive shaft that is coupled to a motor and a bidirectional hydrostatic transmission pump. The transmission also includes an electronically controlled pressure regulating valve in communication with an output of the charge pump and linked to a controller. The transmission also includes a bidirectional variable displacement hydrostatic motor. The hydrostatic motor is in communication with two input/output lines. The input/output line having a higher pressure than the other input/output line serves as an input line while the input/output line having a lower pressure serves an output line. Both input/output lines are in communication with the hydrostatic transmission pump. The hydrostatic motor is coupled to a work implement. The hydrostatic transmission also includes a flush valve in communication with the hydrostatic motor and both input/output lines. The flush valve and hydrostatic motor are both in communication with a flush orifice and a flush relief valve. When the pressure regulating valve causes the charge pump to operate at or near full capacity, fluid exits the flush valve and passes through both the flush orifice and the flush relief valve. When the pressure regulating valve causes the charge pump to operate at or near minimum capacity, fluid exits the flush valve and passes through the flush orifice without passing through the flush relief valve.

BRIEF DESCRIPTION OF THE DRAWINGS

FIG. 1 is a schematic of a closed hydrostatic circuit that includes a hydrostatic transmission and flush and charge systems.

DETAILED DESCRIPTION

Use of the disclosed modulated circuit flushing flow may limit the power loss at low speed conditions to the lowest necessary loss and may still provide the requisite flushing and charge flow at high speed conditions.

Turning to FIG. 1, a closed hydrostatic circuit 10 is disclosed that includes a hydrostatic transmission 11 and a charge system 12. The hydrostatic transmission 11 also includes a flush system 13. The flush system 13 pumps cool pilot oil from the low pressure side of the bidirectional variable displacement hydrostatic motor 14 to maintain a sufficiently low temperature of the hydraulic oil, to cool the remainder of the hydrostatic circuit and to maintain the viscosity of the hydrostatic oil below about 12 sCt, although other oils of different viscosities may be used.

The flush system 13 includes a flush spool valve 15 which directs cooling flow from the cool or low pressure side of the hydrostatic transmission 11. Specifically, the hydrostatic transmission 11 communicates to the flush system 13 through two lines 16, 17. Depending upon the direction of the bidirectional variable displacement hydrostatic transmission pump 18, one of the lines 16, 17 will be of a higher pressure than the other line 16, 17 and will therefore serve as an input to the motor 14. The flush valve 15 is in a neutral position as shown in FIG. 1 because of the two balancing springs 20, 21. When one of the lines 16, 17 is of a lower pressure, the flush valve 15 moves towards the low pressure line 16, 17, thereby delivering fluid from the low pressure line 16, 17 through the flush valve 15 to the relief valve 22 and control orifice 23. For example, assuming the line 17 is the low pressure output line, the flush valve 15 drops downward in the orientation of FIG. 1 thereby providing communication from the low pressure line 17, through the line 19, through the flush valve 15 and towards the relief valve 22.

At low pressures, the relief valve 22 is inactivated due to the bias of the spring 24. In this case, fluid passes through the control orifice 23 only. The control orifice 23 may be adjusted to provide a minimum flushing flow when the system 10 is operating at a low speed. Fluid passes through the control orifice 23 and out the drain lines 26, 27 before passing through the cooler 28. After the pilot fluid passes through the cooler 28, it is returned to the fluid reservoir 29. The reservoir 29 includes two filters 32, 33 and an air bleed 34.

Returning to the flush system 13, at high pressure, the bias of the spring 24 is overcome and the relief valve 22 moves downward in the orientation of FIG. 1 so that after fluid passes through the flush valve 15, the fluid may pass through the relief valve 22 and the parallel orifice 23 before passing through the drain lines 26, 27 on the way to the cooler 28. Check valves 36, 37 prevent commingling the fluids between the input/output lines 16, 17 and ensure that the high pressure line 16 or 17 is in communication with the control valve 38. The control valve 38 is a two position-three way control valve that is activated by a solenoid 39 that, in turn, is controlled or activated by a controller 41. The controller 41 also controls the solenoid 42 of the pressure regulating valve 43 of the charge system 12.

Returning to the flush system 13, the control valve 38 is in communication with the cylinder 44 that, in turn, controls the output of the motor 14. The motor 14 is coupled to a drive shaft 46 that drives a work implement.

Turning to the charge system 12, a variable displacement charge pump 47 is coupled to a drive shaft 48 which, in turn, is coupled to the hydrostatic transmission pump 18. The hydrostatic transmission pump 18 is coupled by way of a drive shaft 49 to a motor or prime mover 51. When additional charge fluid is required, the controller activates the solenoid 42, thereby moving the pressure regulating valve 43 to the left in the orientation of FIG. 1 which passes fluid through the safety valve 53 and on to the cylinder 54. The cylinder 54 then controls the output of the charge pump 47 to increase the flow of charge fluid through the line 55 and through the filter 56. In the event the filter 56 becomes clogged, fluid may pass through the spring biased check valve 57. Pilot fluid is returned from the cylinder 54 through the drain line 27 as shown.

The hydrostatic transmission pump 18 output is controlled by a four port, three position control valve 58. The control valve 58 includes two solenoids 59, 60 that are controlled by the controller 41. The control valve 58 supplies fluid to either side of the double acting cylinder 61, depending upon which direction the bidirectional variable displacement hydrostatic motor is operating. Pilot fluid passes through the line 62 and through the control orifice 63 under low pressure conditions or through the relief valve 64 under high pressure conditions. Similarly, relief valves 66, 67 are provided in both input/output lines 16, 17 respectively. Excess charge fluid may be stored in the accumulator 68.

INDUSTRIAL APPLICABILITY

Thus, a charge system 12 and a flush system 13 are provided for a hydrostatic transmission 11. The charge pump 47 may be temperature compensated as the controller 41 controls the action of the pressure regulator valve 43. If the temperature of the hydraulic fluid increases, the controller can increase the output of the charge pump 47 by activating the solenoid 42 of the pressure regulating valve 43 thereby increasing the charge fluid flow. The two position-three way pressure regulating valve 43 also maintains the charge pressure. The pressure regulating valve 43 uses a solenoid 42 and controller 41 to adjust the differential pressure setting, which increases the displacement of the charge pump 47. When the hydrostatic control system 10 detects a high hydraulic temperature condition, the solenoid 42, under the direction of the controller 41, shifts the two position-three way pressure regulating valve 43 to increase the charge pump flow. In additional, a control orifice 23 and pressure relief valve 22 are incorporated downstream of the flushing valve 15 in parallel. The control orifice 23 controls the minimum flushing flow, which occurs at low operating temperatures. When a maximum flushing flow is required, the system 10 operates at a higher pressure and flushing fluid flows through both the control orifice 23 and the relief valve 22.

What is claimed is:

1. A closed hydrostatic circuit with variable charge and flushing systems, hydrostatic circuit comprising:
    a reservoir configured to hold a supply of fluid;
    a variable displacement charge pump configured to supply charge fluid and pilot control fluid to the hydrostatic circuit;
    an electronically controlled pressure regulating valve in communication with an output of the charge pump and linked to a controller;
    a bidirectional variable displacement hydrostatic motor, the hydrostatic motor connected to two input/output lines, the input/output line having a higher pressure than the other input/output line serving as an input line, the input/output line having a lower pressure serving as an output line;
    a flush valve in communication with the hydrostatic motor and both input/output lines;
    the flush valve and hydrostatic motor both being in communication with a flush orifice and a flush relief valve;
    when the pressure regulating valve causes the charge pump to operate at or near full capacity, fluid exits the flush valve and passes through both the flush orifice and the flush relief valve, and when the pressure regulating valve causes the charge pump to operate at or near minimum capacity, fluid exits the flush valve and passes through the flush orifice without passing through the flush relief valve.

2. The hydrostatic circuit of claim 1 wherein the pressure regulating valve controls movement of a charge cylinder having a piston that controls an output of the charge pump.

3. The hydrostatic circuit of claim 2 further including a safety valve disposed between the pressure regulator valve and the charge cylinder.

4. The hydrostatic circuit of claim 1 further including an electronically controlled motor regulator valve in communication with the flush orifice and relief valve and a cylinder, the cylinder accommodating a piston, the piston coupled to the hydrostatic motor.

5. The hydrostatic circuit of claim 1 wherein the charge pump and hydrostatic motor communicate pilot fluid to the reservoir.

6. The hydrostatic circuit of claim 1 wherein a controller controls the motor regulator valve and the pressure regulator valve.

7. The hydrostatic circuit of claim 1 wherein the safety valve, the charge cylinder and the motor regulating valve communicate pilot fluid to the reservoir.

8. The hydrostatic circuit of claim 1 wherein excess charge fluid is accommodated in an accumulator.

9. A method of charging and flushing a closed hydrostatic circuit, the method comprising:
    electronically controlling a variable displacement charge pump configured to supply charge fluid and pilot control fluid to a hydrostatic circuit;
    electronically controlling a bidirectional variable displacement hydrostatic motor;
    operating a motor at or near maximum capacity and flushing fluid through a flush valve and through both a control orifice and a relief valve;
    operating the motor at less than the maximum capacity and flushing fluid through the flush valve and through the control orifice only.

10. The method of claim 9 further including controlling movement of a charge cylinder having a piston that controls an output of the charge pump.

11. The method of claim 9 further including a safety valve disposed between the pressure regulator valve and the charge cylinder.

12. The method of claim 9 further including an electronically controlled motor regulator valve in communication with the flush orifice and relief valve and a cylinder, the cylinder accommodating a piston, the piston coupled to the hydrostatic motor.

13. The method of claim 9 further including communicating fluid to the reservoir from the charge pump and hydrostatic motor.

14. The method of claim 9 further including controlling the motor regulator valve and the pressure regulator valve with a common controller.

15. The method of claim 9 further including communicating pilot fluid to the reservoir from a safety valve, a charge cylinder and the motor regulating valve.

16. The method of claim 9 further including accumulating charge fluid in an accumulator.

17. A hydrostatic transmission comprising:
    a reservoir configured to hold a supply of fluid;
    a variable displacement charge pump configured to supply charge fluid and pilot control fluid to the hydrostatic circuit, the charge pump coupled to a drive shaft that is coupled to a motor and a bidirectional hydrostatic transmission pump;
    an electronically controlled pressure regulating valve in communication with an output of the charge pump and linked to a controller;
    a bidirectional variable displacement hydrostatic motor, the hydrostatic motor in communication with to two input/output lines, the input/output line having a higher pressure than the other input/output line serving as an input line, the input/output line having a lower pressure serving as an output line, both input/output lines in communication with the hydrostatic transmission pump, the hydrostatic motor coupled to a work implement;
    a flush valve in communication with the hydrostatic motor and both input/output lines;
    the flush valve and hydrostatic motor both being in communication with a flush orifice and a flush relief valve;
    when the pressure regulating valve causes the charge pump to operate at or near full capacity, fluid exits the flush valve and passes through both the flush orifice and the flush relief valve, and when the pressure regulating valve causes the charge pump to operate at or near minimum capacity, fluid exits the flush valve and passes through the flush orifice without passing through the flush relief valve.

18. The hydrostatic transmission of claim 17 wherein the pressure regulating valve controls movement of a charge cylinder having a piston that controls an output of the charge pump.

19. The hydrostatic transmission of claim 17 further including an electronically controlled motor regulator valve in communication with the flush orifice and relief valve and a cylinder, the cylinder accommodating a piston, the piston coupled to the hydrostatic motor.

20. The hydrostatic transmission of claim 17 wherein a controller controls the motor regulator valve and the pressure regulator valve.

* * * * *